United States Patent Office 3,461,660
Patented Aug. 19, 1969

3,461,660
TANGENTIAL BELT DRIVE FOR SPINDLES ON SPINNING AND TWISTING FRAMES
Klaus Nimtz, Krefeld, Gustav Franzen, Neersen, and Willi Heimes, Krefeld, Germany, assignors to Palitex Project-Company G.m.b.H., Krefeld, Germany
Filed Dec. 6, 1965, Ser. No. 511,861
Claims priority, application Germany, Dec. 7, 1964,
P 35,632
Int. Cl. D01h 13/00, 13/08
U.S. Cl. 57—105                                13 Claims

ABSTRACT OF THE DISCLOSURE

A belt drive for the spindles in a spinning and twisting frame comprising pressure rollers located between or facing the wharves of the spindles the pressure being applied to the belt by the pressure rollers or by the wharves through a central control in dependence upon the speed of the driving belt.

---

This invention relates to a tangential belt drive for spindles of all kinds on spinning and twisting frames, comprising pressure rollers disposed between or facing the wharves.

Drives of this kind are known in the art, and generally are so constructed that each pressure (press-on roller is separately pressed against the belt by the thrust of a spring, weights or cable means or by tensioning. It is not easy by such means to apply a large number of pressure rollers with uniform pressure against the belt, and even when the pressure rollers have been successfully adjusted to a uniform contact pressure, the pressure is an optimum value only for a particular working operation. For other operations the expended deformation energy is excessive and/or slippage of the belt on the spindles occurs.

To some extent these disadvantages can be compensated by using rigidly mounted pressure rollers and by mounting the spindles on swivel arms urged by springs or weights into contact with the belt. In one direction of travel the pressure on the belt will then rise with increasing speed of the belt, but when the direction is reversed, as is frequently necessary in spinning and twisting frames, contact pressure decreases with increasing speed of the belt.

It is the object of the invention to provide an arrangement which will eliminate the disadvantages of the arrangements known in the art, and according to the invention this is achieved by controlling from a common centre the pressure of the movable rollers or of the spindles (swivel-mounted) on the belt in accordance with the momentarily existing power demand, which depends upon the speed of revolution of the spindles.

In the arrangement according to the invention the pressure rollers may be moved against the moving tangential belt by mechanical, hydraulic, pneumatic, electrical or magnetic means. For example, a control shaft coupled with the motor speed regulator for rotation thereby may be provided with cam, crank, gear or the like mechanical means for transmitting thrust to the pressure rollers against the belt. The pressure of a servo medium in a central control pipe may be generated for instance by a pump coupled with the motor driving the frame.

In another embodiment of the invention, the shaft of the driving motor may be coupled with the drive shaft of a generator. The current thus generated may then be used to energise coils or solenoids adapted to apply thrust to the pressure rollers. The speed regulator of the driving motor may be coupled with the shaft of a servo transformer, the current generated in the secondary windings of the transformer energising the coils or solenoids for applying thrust to the pressure rollers.

In another embodiment of the tangential belt drive according to the invention, the belt itself drives a regulator, for instance in the form of a centrifugal governor, which controls the servo means for instance in the manner described.

In instances in which a squirrel cage motor is used as a drive means, which cannot be speed controlled, it is preferred to make use of a centrifugal governor driven by the belt and directly controlling the central control means.

An arrangement according to the invention permits the contact pressure between belt and wharve to be adapted to the necessary and optimal speed of the belt in a simple and convenient way. After initial adjustment the system thereafter automatically adjusts itself to optimum conditions when the speed of the motor and hence the speed of the belt are adjusted.

Several preferred embodiments of the invention are illustrated in the accompanying drawings, of which FIG. 1 is a perspective view of a tangential belt drive in which pressure rollers are actuated by a mechanical linkage.

Figure 14:
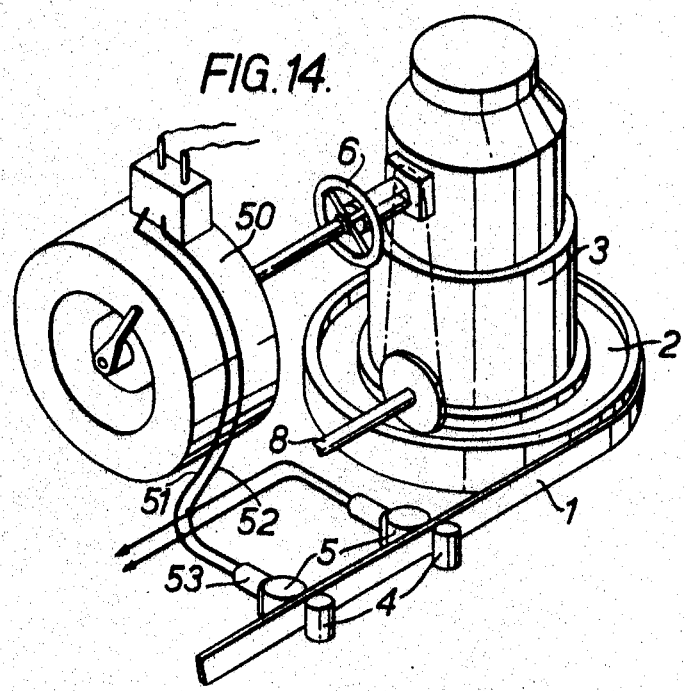
Figure 15:
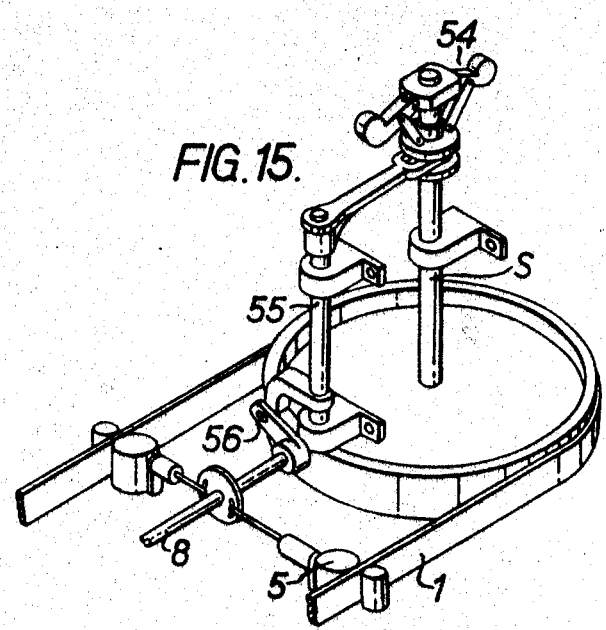

FIGURE 14 is a fragmentary perspective view of another embodiment of the tangential belt drive wherein the belt itself drives a regulator, for instance in the form of a centrifugal governor, which controls the servo means; and FIGURE 15 is a fragmentary perspective view of another embodiment wherein rotary movements of the control shaft are controlled by a centrifugal governor driven from the drive belt.

Figure 1:
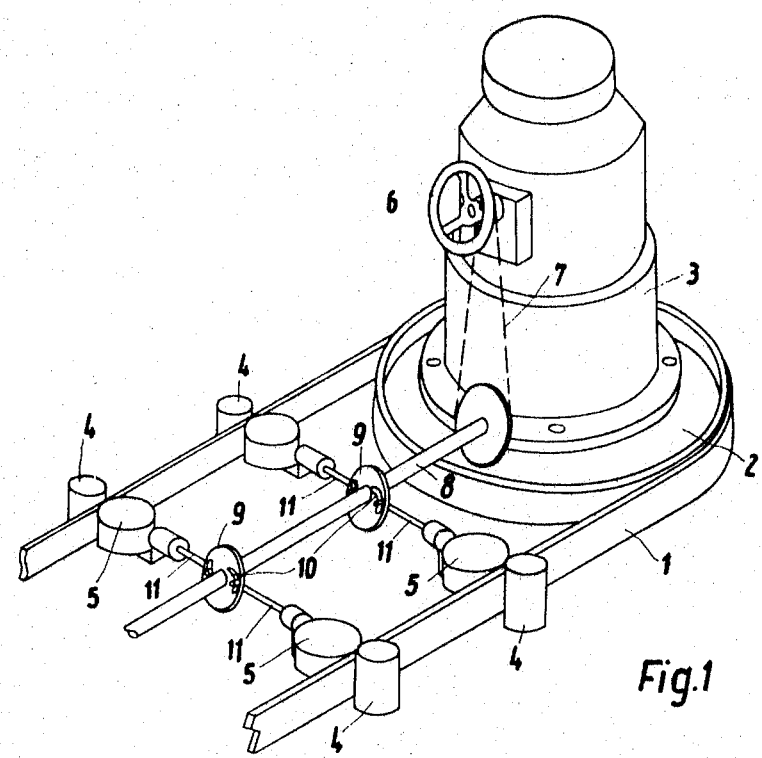

Referring now to FIG. 1, belt 1 is driven by a sheave 2 keyed to the shaft of an electric motor 3. Spindles are not shown as such but the wharves thereof are indicated at 4, the pressure rollers being indicated at 5, and in this instance face the spindles. For regulating the speed of the motor 3 a handwheel 6 is provided. A flexible device 7 for instance a chain, connects handwheel 6 and a control shaft 8. The control shaft 8 carries cam discs 9 having arcuate cam slots 10 engaged by cam followers 11 adapted to displace the pressure rollers 5 in a direction for increasing or decreasing the pressure on the belt. A compensating spring (not shown) may be interposed between the cam follower 11 and the holder of roller 5 to compensate differences in the thickness of the belt.

If the speed of the motor 3 is increased by rotation of the handwheel 6, the described arrangement simultaneously causes the control shaft 8 to be rotated. Provided the position and shape of the slots 10 in the cam discs 9 and the pressure rollers are appropriately designed in relation to the speed of the motor, the pressure of the pressure rollers will vary as desired according to the selected speed of the tangential driving belt 1.

Figure 2:
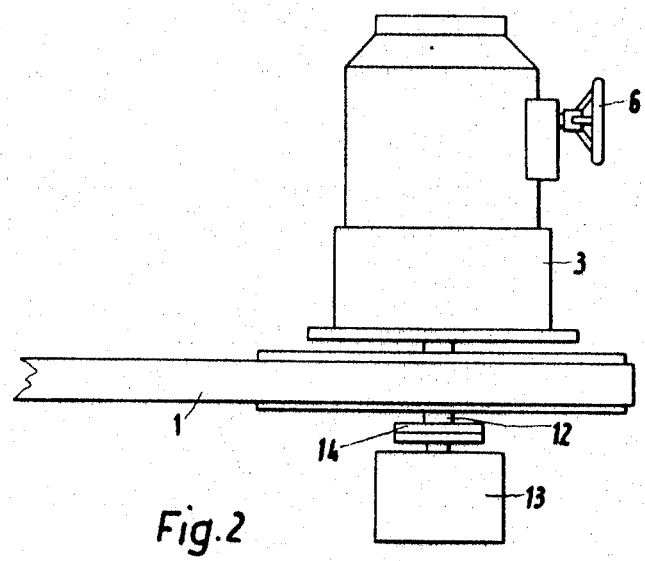
FIG. 2 is a side elevation of a tangential belt drive, in which pressure rollers are actuated through the agency of a variable-pressure fluid mechanism.

In FIG. 2 the motor is likewise fitted with a handwheel 6 for regulating its speed and that of belt 1. Instead of the central control means for the pressure rollers being derived from the regulation handle, a pump 13 is connected to the shaft 12 of the motor 3 by a coupling 14. The pump delivers a pressure fluid at a pressure proportional to the speed of revolution of the motor 3. This pressure fluid may then be used in various ways to vary the contact pressure of the pressure rollers, for instance as hereinafter described in relation to FIGS. 3 and 4.

Figure 3:
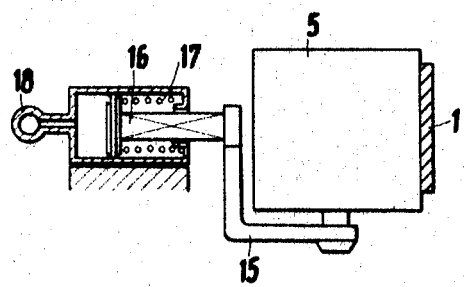
FIG. 3 is a vertical section of a pressure roller with associated control mechanism suitable for use with a tangential belt drive of the type shown in FIG. 2.

Thus in FIG. 3, the pressure roller 5 is mounted on an arm 15 which can be advanced by a piston 16 displaceable against the resistance of a restoring spring 17. The piston is displaceable by the pressure fluid, such as oil or compressed air, acting on the piston face contrary to the restoring spring 17. The pressure medium is admitted through a pipe marked 18.

Figure 4:
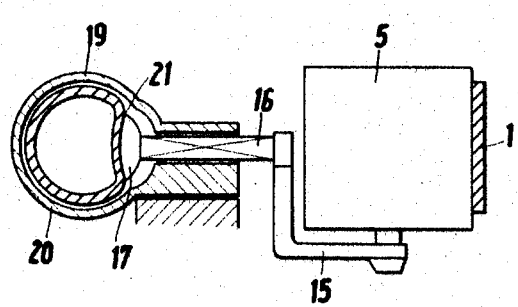
FIG. 4 is a vertical section of a pressure roller with a different associated control mechanism suitable for use with a tangential belt drive of the type shown in FIG. 2.

In FIG. 4 the pressure roller 5 and its arm are displaceable by a special servo device comprising a rigid tube 19 containing a flexible tube 20. The rigid tube 19 may conveniently form a slideway for mounting the carrier 16. The carrier of arm 15 is formed with a head 17 which is so positioned that it somewhat squeezes the flexible tube 20 together. When the pressure inside tube 20 rises the head 17 and the non-rotatably mounted carrier 16 are forced outwards, thereby increasing the pressure of the pressure roller 5 on the belt 1. This arrangement is exceptionally simple and not likely to cause trouble, and the compressed air as a servo fluid may be particularly effectively used for this device, compressed air providing yielding pressure of the roller on the belt. For hydraulic operation it is preferred to provide an intervening hydraulic accumulator to ensure the application of yielding pressure. Both in the instance of hydraulic and compressed air operation the rollers will automatically adjust themselves to the operating conditions existing at the spindle.

It is advisable to make provision for the stopping of the entire spinning or twisting frame if the hydraulic or compressed air pressure in the servo system should unduly fall or fail, for instance by providing a pressure responsive switch which will stop the machine.

Figure 5:
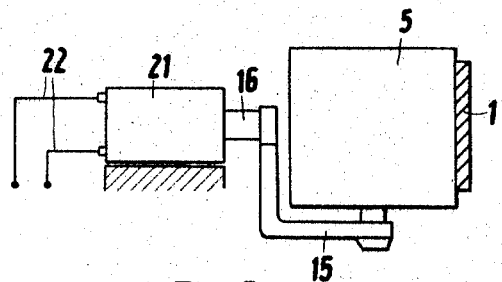
FIG. 5 is a vertical section of a pressure roller or with associated control mechanism which acts on a magnetic principle.

FIG. 5 is an arrangement in which the carrier 16 is displaceable in the direction of increasing or reducing roller pressure by means of an electromagnetic and/or a permanent magnet. The electromagnets or permanent magnets are contained in casing 21, whereas the electrical leads are marked 22.

The arrangement is controlled by the current generated by a dynamo coupled to the driving motor. The arrangement may be similar to that illustrated in FIG. 2, except that the pump 13 is replaced by a suitable generator. Instead of a generator, a servo transformer appropriately connected to the regulator of the motor may be employed. In each instance the magnetic field which imparts thrust to the roller constitutes an elastic coupling means which permits each roller to adjust itself individually to the conditions at its associated spindle.

Figure 6:
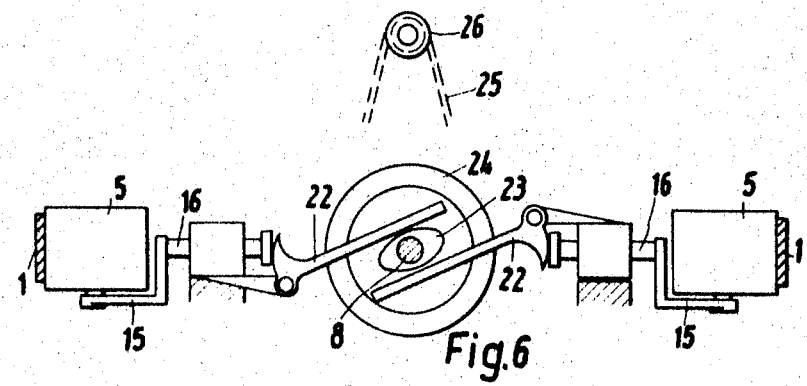
FIGS. 6, 7 and 8 are each schematic representations of linkages for controlling the pressure rollers.

Referring now to FIG. 6, the carrier 16 or arm 15 of the rollers 5 in FIG. 6 are displaceable by bellcrank levers 22 which are themselves deflectable by a twin cam eccentric 23 keyed to shaft 8. Shaft 8 is rotatable by a chain 25 which runs over a chain wheel 24 and a driving pinion 26 mounted on the shaft of the handwheel 6 which regulates the speed of the motor 3 in the manner shown in FIG. 1. A spring (not shown) is interposed between carrier 16 and bellcrank 22 to provide a yielding transmission member.

Figure 7:
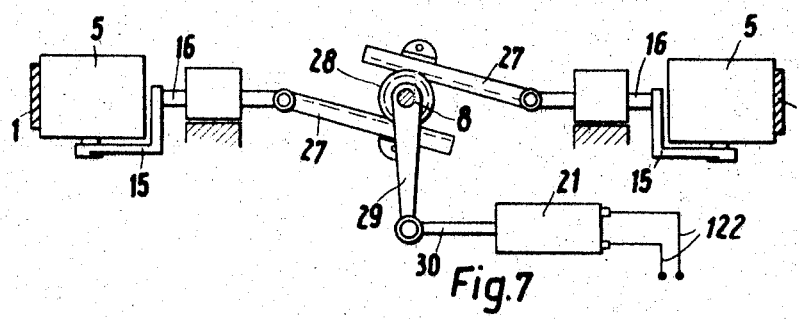

In FIG. 7, the arrangement is such that the carriers 16 are displaceable by racks 27. These racks are movable by a common pinion 28 keyed to shaft 8. The shaft 8 is rotatable by a lever 29 which is itself deflectable by the rod extension 30 of the plunger of a solenoid contained in casing 21 and connected to wiring 122 connected for example to a generator which is coupled to the shaft of the driving motor and may replace the pump. An elastically yielding intermediate member may be provided in the form of a spring, as described for the embodiment shown in FIG. 6.

Figure 8:
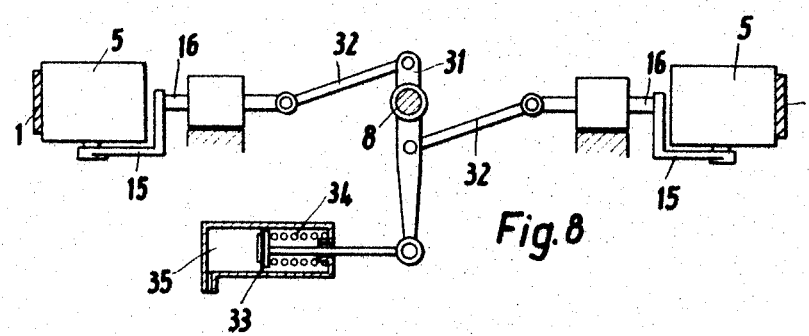

In the arrangement according to FIG. 8, the carrier 16 is displaceable by a two-armed lever 31 and links 32. The two-armed lever is keyed to shaft 8 and the shaft is arranged to be rotated by hydraulic servo means comprising a piston 33 displaceable by a hydraulic servo medium in 35 against the resistance of a spring 34. Intermediate yielding transmission elements may be provided, as described for the embodiment shown in FIG. 6.

These elastic intermediate members, i.e. springs, equalise differences in the distances of displacement and thus permit the rollers to adjust themselves individually to the operating conditions existing at the roller or at the associated spindle.

The arrangement according to FIGS. 7 and 8 may alternatively be controlled in the manner illustrated in FIG. 6, i.e. with the aid of a chain from the handwheel of the motor speed regulator. Alternatively the rotary movements of the shaft 8 in the aforesaid FIGS. 6, 7 or 8, may be controlled by a centrifugal governor driven for instance by the belt itself.

In the embodiments that have bene described, the pressure rollers are displaceable linearly against the side of the belt. The invention can equally be applied if the pressure rollers are mounted on swivel-mounted or eccentric levers and they are therefore obliged to move in corresponding paths. It is also within the scope of the invention to press the spindles instead of the rollers against the belt and to mount the rollers on fixed roller axles. Examples of such alternative embodiments are illustrated in FIGS. 9 to 13.

Figure 9:
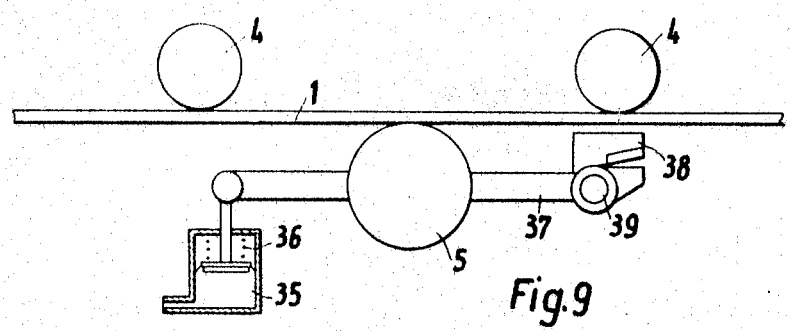
FIG. 9 is a schematic representation of a control device for a swivel mounted pressure roller.

In FIG. 9 the pressure roller 5 is mounted on a swivel arm 37 pivoted at 39 in a bearing bracket 38. The arm is deflectable by a piston device indicated at 35/36 which is operable from a central control point by hydraulic or pneumatic means.

Figure 10:
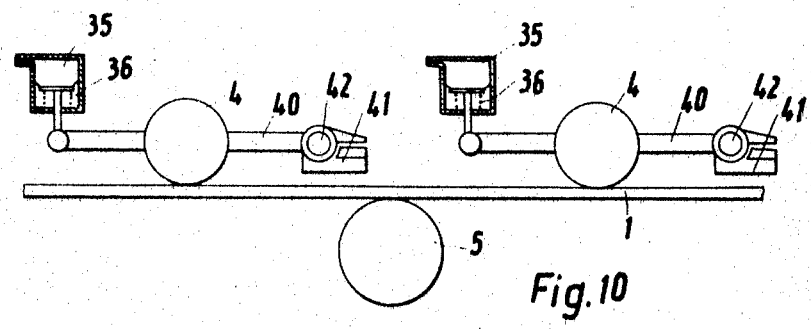
FIG. 10 is a schematic representation of a control device in which the pressure roller is rotatably mounted in or on a fixed bearing, and co-operates with wharves.

In FIG. 10 the roller 5 is fixed, whereas the wharves 4 are mounted on swivel arms 40 pivoted on brackets 41 and 42. These arms are likewise operable by servo means 35/36 from a central control point.

Figure 11:
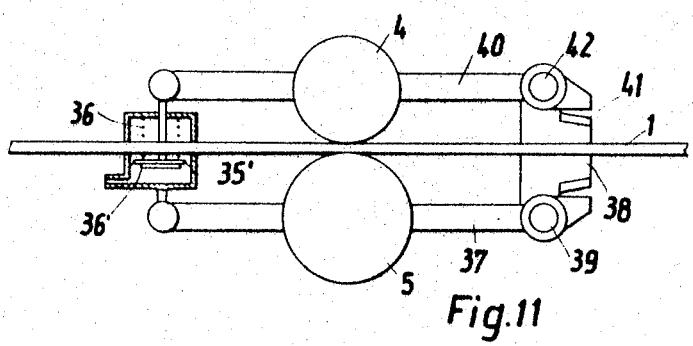
FIG. 11 is a schematic representation of a control device in which the pressure roller is swivel mounted and co-operates with a swivel-mounted wharf.

FIG. 11 is an arrangement in which both the wharve 4 and the roller 5 are mounted on swivel arms 40 and 37 respectively on opposite sides of the belt 1. The arms 37 and 40 are operable by a single servo means comprising a movable cylinder 35′ containing a spring 36 and piston 36′, the application with pressure of roller 5 and wharve 4 to the belt 1 being due to the thrust of spring 36. Alternatively, the converse arrangement could be used in which it is the pressure medium in the cylinder that urges the roller and wharve against opposite sides of the belt.

Figure 12:
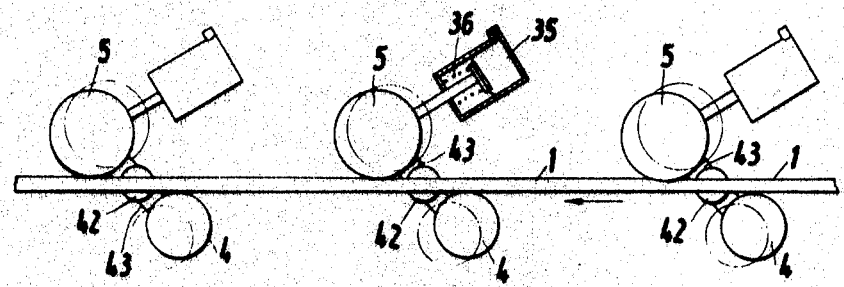
FIGS. 12 and 13 are each a schematic representation of a control device in which pressure rollers and an associated wharf are swivel mounted on a common pivot-member.

In FIG. 12 wharve 4 and roller 5 are mounted on a common swing arm 43 fulcrumed at 42. The deflection of the arm 43 is effected by the servo means 35/36 from a central point of control.

Figure 13:
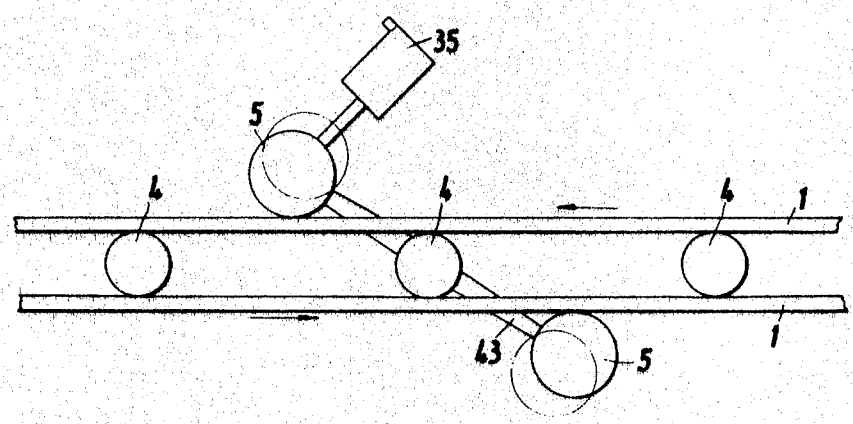

In FIG. 13 the belt is arranged to rotate the wharve by simultaneous contact of the pulling and the pulled side of the belt with the wharve. The pressure rollers are mounted on a swivel arm 43 fulcrumed on the axle of the wharve 4. The pressure of the pressure rollers is supplied by servo means 35 in a manner analogous to that hereinbefore described with reference to the preceding embodiments.

In the embodiments shown in FIGS. 8 to 13, the servo means may be supplied by a pump coupled to the driving motor as described with reference to FIG. 2.

Movement of the pressure rollers and/or of the spindles towards the belt should be limited in practice to prevent excessive deflection of the belt for instance when a spindle is unscrewed or removed.

The tension of the belt in spinning and twisting frames is controlled in conventional manner by special tensioning means. These may with advantage be likewise subjected to the action of the central control of the pressure rollers so that the tension of the belt will always match the pressure of the rollers. A suitable arrangement of this kind may comprise swivel arms carrying tensioning rollers for stretching the belt, the swivel angle of said swivel arms being preferably hydraulically or pneumatically set. The employment of mechanical or electric adjusting means would likewise be feasible, for instance, for purposes of co-ordination with the central control means.

In the FIGURE 14 embodiment, the speed regulator is coupled with the shaft of a servotransformer 50, the current generated in the secondary windings by lines 51, 52 energizing the coil of a solenoid 53 (see FIGURE 5). FIGURE 15 shows a centrifugal governor 54 for displacing a shaft 55 to operate arm 56 to turn shaft 8 according to the belt-drive speed and control the pressure of roller 5. It thus responds to the speed of the belt or its driving motor, i.e., to the belt-drive speed. The cenrifugal governor is driven e.g., by the belt itself as aforementioned.

What is claimed is:

1. A drive for spindles in a spindle and twisting frame, consisting essentially of: a driving belt; a driving motor for said driving belt; a plurality of wharve elements engageable with one side of said driving belt; a plurality of pressure roller elements engageable with the other side of said driving belt, at least the elements of one of said plurality of pressure roller and wharve elements being moveable toward and away from the respective side of said driving belt for variation of the force of engagement of said moveable elements therewith; and control means responsive to the speed of the driving motor and connected to said plurality of moveable elements for applying pressure to said driving belt through said plurality of moveable elements in dependence upon the speed of the driving motor.

2. A device according to claim 1, in which said control means comprises mechanical means.

3. A device according to claim 1 in which said control means comprises hydraulic means.

4. A device according to claim 1 in which said control means comprise pneumatic means.

5. A device according to claim 1 in which said control means comprise electric means.

6. A device according to claim 1 in which said control means comprise magnetic means.

7. A device according to claim 1 in which said control means comprise a main pipe and pump means responsive to the speed of said driving motor for supplying fluid under pressure to said main pipe and means connected to said main pipe for transmitting fluid pressure to said plurality of moveable elements.

8. A device according to claim 1, wherein the control means include a speed regulator for said driving motor and wherein said control means comprise shaft means rotatably coupled with said motor speed regulator, the said shaft means being provided with a plurality of mechanisms each for transmitting pressure to at least one of the said moveable elements and thereby to the said driving belt.

9. A device according to claim 5 in which the said control means comprise a generator coupled to said driving motor and means including coil means supplied by said generator for applying pressure to the said moveable elements.

10. A device according to claim 5 in which said control means comprise a speed regulator for said driving motor and a servo transformer coupled to the said speed regulator, the secondary circuit of the said transformer containing coil elements of means for applying pressure to the said moveable elements.

11. A device according to claim 1 in which said control means comprise a speed regulator which is driven by the said driving belt.

12. A device according to claim 11, in which the said regulator is a centrifugal governor.

13. A device according to claim 1 wherein said pressure roller elements constitute tensioning means for the said driving belt, said tensioning means being controlled by the said control means.

References Cited

UNITED STATES PATENTS

| 1,665,422 | 4/1928 | Setzer | 57—105 |
| 2,953,894 | 9/1960 | Stahlecker et al. | 57—105 |

FOREIGN PATENTS

| 873,260 | 7/1961 | Great Britain. |

WILLIAM S. BURDEN, Primary Examiner